United States Patent [19]

Wood et al.

[11] 3,956,728

[45] May 11, 1976

[54] SIGNAL CORRELATION SYSTEM

[75] Inventors: David E. Wood, Schenectady; William T. Gannon, Scotia, both of N.Y.

[73] Assignee: General Electric Company, Schenectady, N.Y.

[22] Filed: Dec. 15, 1961

[21] Appl. No.: 160,699

[52] U.S. Cl. .............................. 340/3 D; 235/181; 343/100 CL
[51] Int. Cl.² ......................................... G01S 9/66
[58] Field of Search ................... 343/5, 17.1, 100.7, 343/16, 113; 340/1, 3, 15, 5, 6, 15.5, 16, 173 LT, 172.5; 181/.53; 235/181

[56] References Cited
UNITED STATES PATENTS

| | | | |
|---|---|---|---|
| 2,243,730 | 5/1941 | Ellis | 343/100 CL |
| 2,451,465 | 10/1948 | Barney | 343/100 CL |
| 2,712,415 | 7/1955 | Piety | 235/181 |
| 2,839,149 | 6/1958 | Piety | 343/100 CL |

Primary Examiner—Richard A. Farley
Attorney, Agent, or Firm—Jerome C. Squillaro; Joseph T. Cohen

EXEMPLARY CLAIM

1. A pulse correlation readout system for a track of light modifying marks formed in a recording medium comprising a light source positioned to direct light onto the recording medium, a mask having a coded series of light modifying marks formed therein representing the signal with which correlation is sought, optical means for optically imaging the light emanating from said recording medium onto said mask, said optical means including image magnifying means, and means for varying the magnification of said image magnifying means whereby the size of the light image of the light modifying marks formed in the recording medium may be varied with respect to the size of the light modifying marks formed in the mask to thereby accomplish a Doppler scan of the signals being correlated, and electro-optical means positioned on the side of said mask opposite from the recording medium for converting light images that pass through said mask into an output electric signal representative of correlation between the mask and the track of light modifying marks being examined.

10 Claims, 14 Drawing Figures

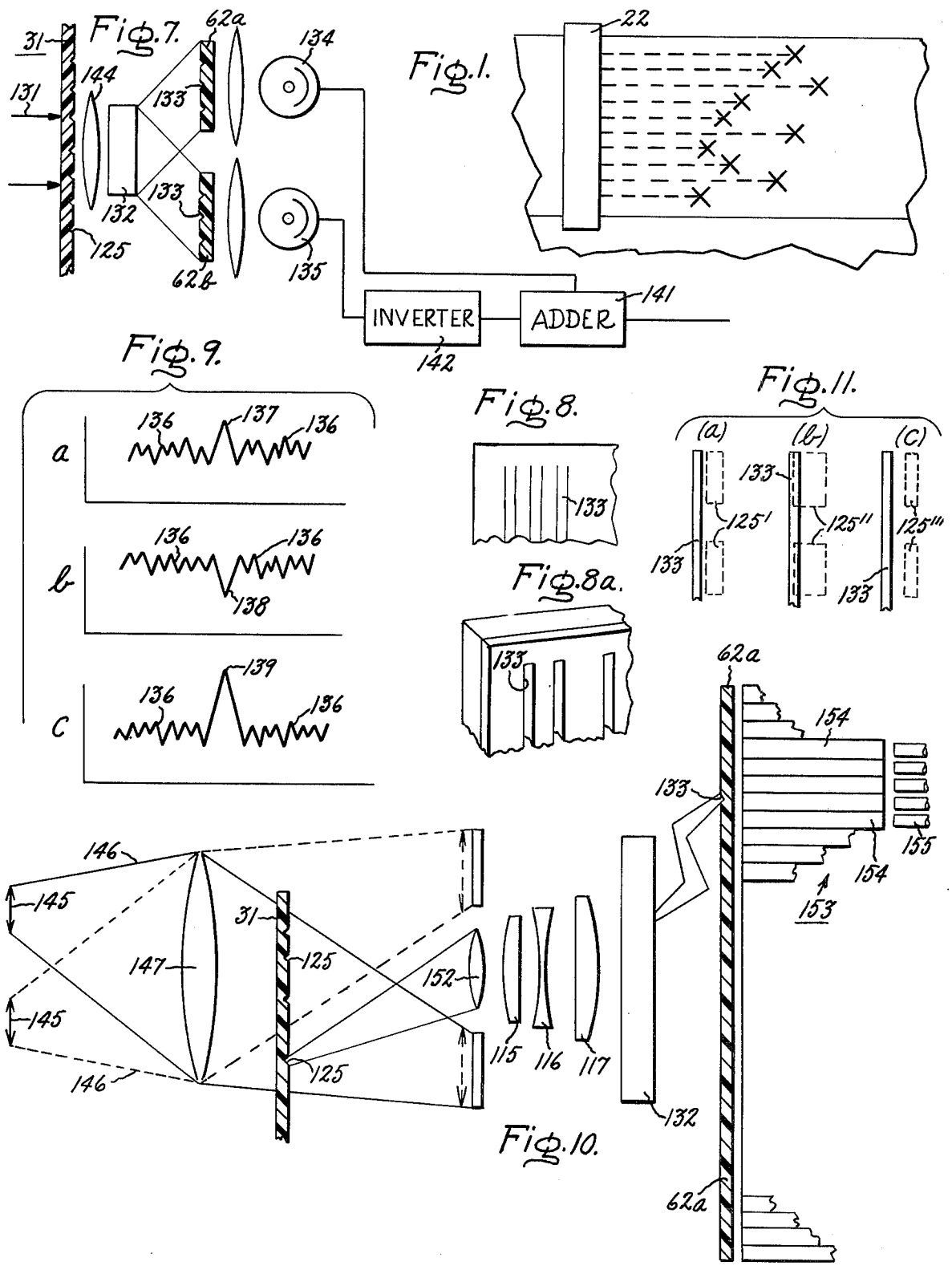

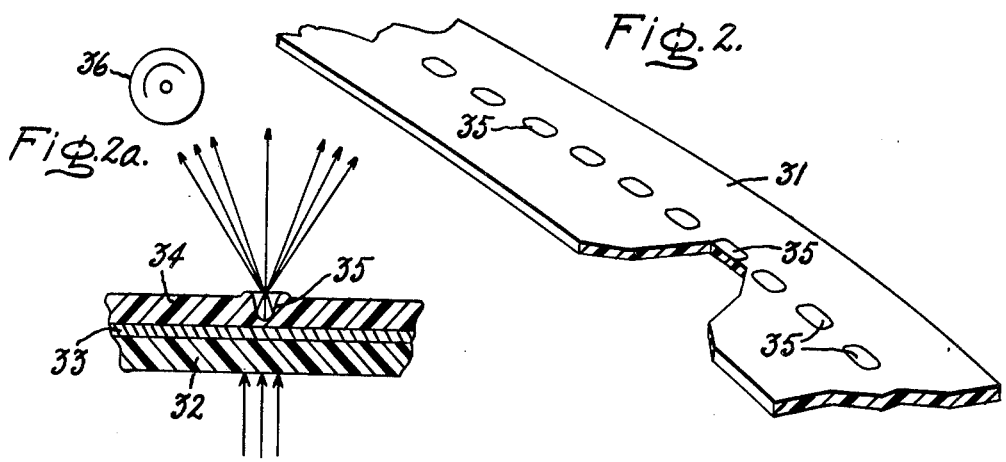
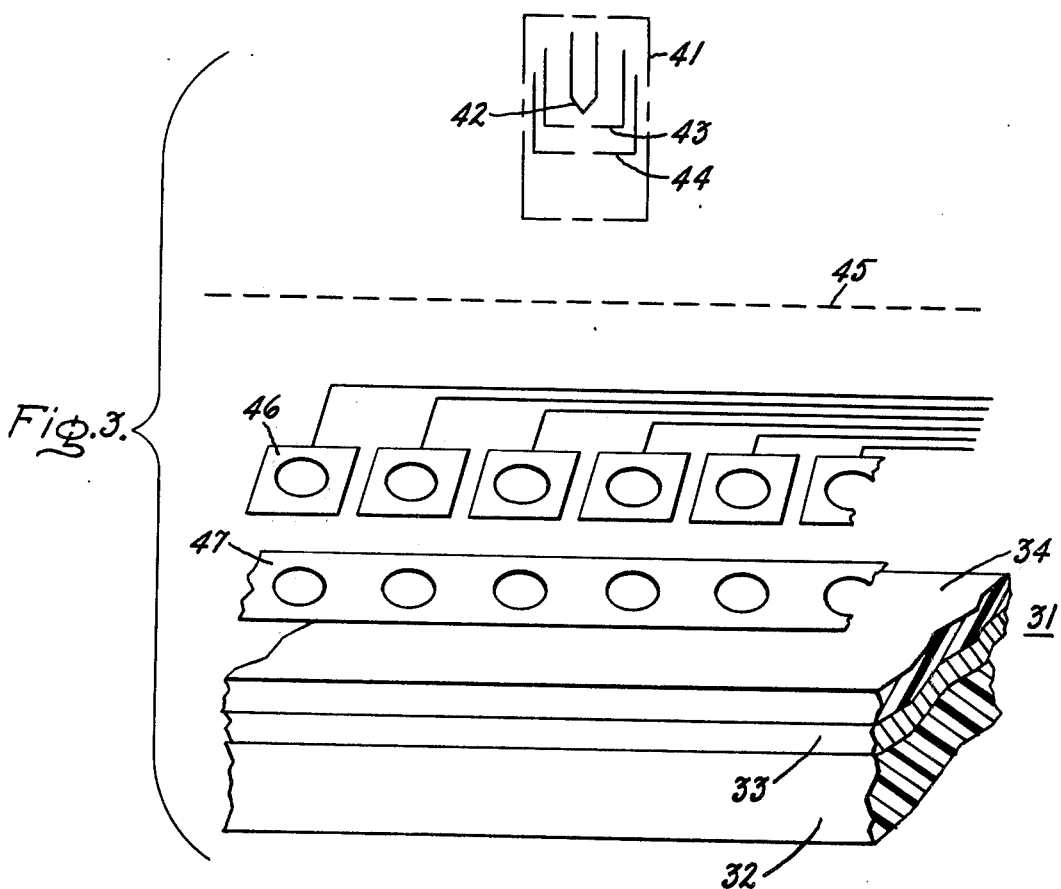

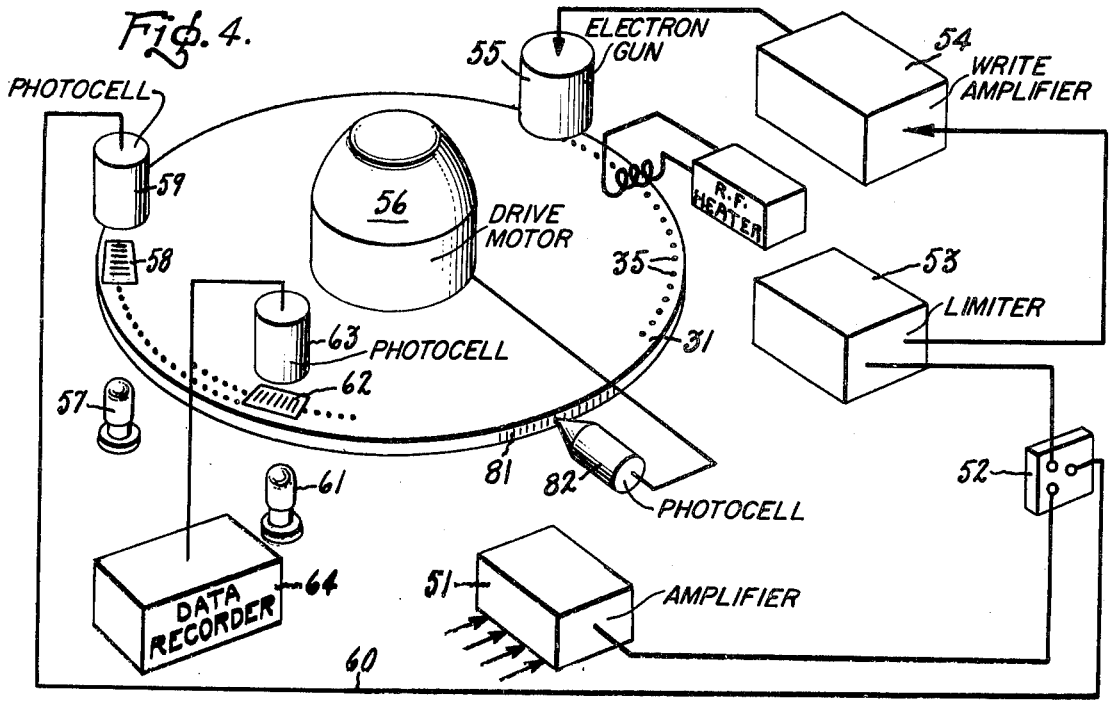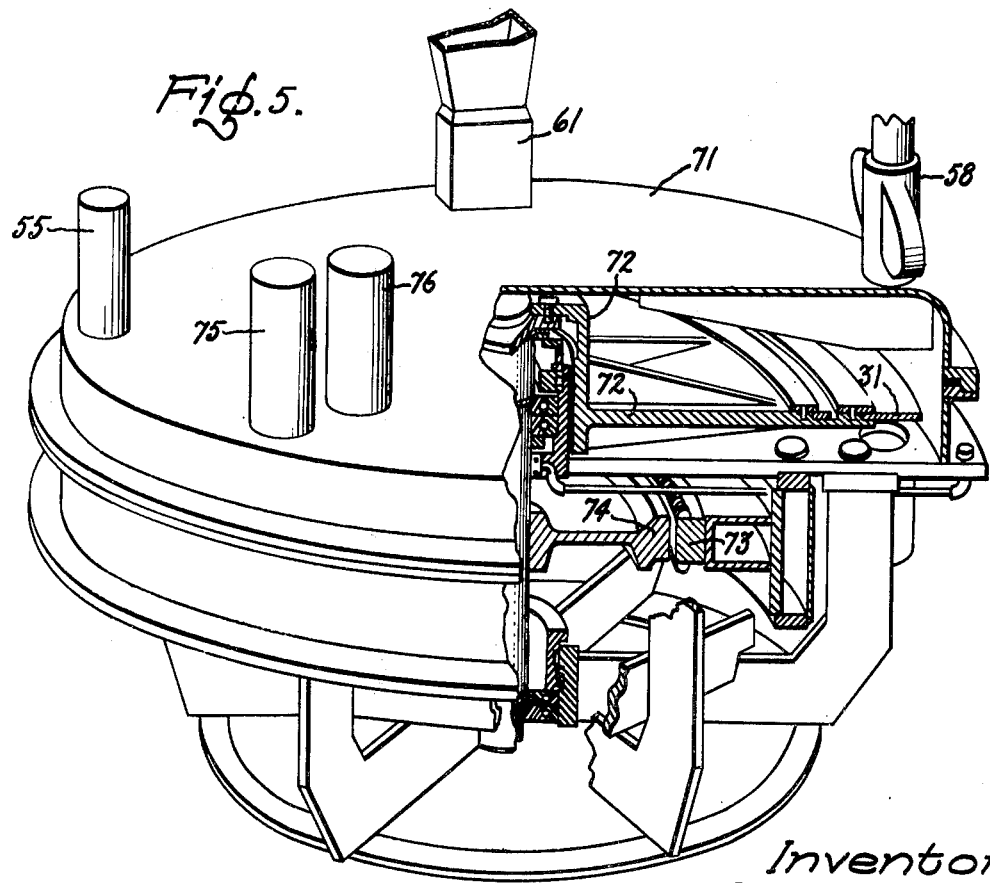

Inventors:
David E. Wood,
William T. Gannon
by Charles W. Helzer
Their Attorney.

SIGNAL CORRELATION SYSTEM

The present invention relates to a new and improved signal correlation system.

More specifically, this invention relates to a new and improved signal correlation system of the type wherein a received signal is compared to a replica of a transmitted signal at a number of points along its length, and the relative phase of the various points on the received signal can be readily shifted with respect to the coded replica in order to conveniently accomplish a Doppler scan of the received signal.

In many electronic devices such as sonar and radar systems, it is desirable to compare a received signal to a replica of the transmitted signal at a number of points along the length of the received signal in order to positively identify that the received signal is indeed a returning echo of the transmitted signal. This process is called signal correlation. One problem of signal correlation is caused by the relative shift in phase of the received echo signal with respect to the transmitted signal caused by target motion. This relative shift in phase of the received signal is referred to as a Doppler shift. In order to correlate the received signal then, it is necessary to take into account the possible Doppler shifts in the received signal, and this may be as little as a fraction of 1 cycle to many hundreds of cycles depending upon the nature of the transmitted signal, target velocity, and so forth.

It is a primary objective of the present invention to provide a new and improved signal correlation system wherein it is possible to easily scan any desired number of Doppler increments over any predicted Doppler frequency spectrum to accomplish correlation of a received signal.

A feature of the invention is a provision of a correlation system which employs a light optical variable magnification lens assembly to accomplish a Doppler scan of the received signal being correlated.

In practicing the invention a new and improved pulse correlation readout system is provided for correlating a track of light modifying marks formed in a recording medium. This system includes a light source positioned to the direct light onto the recording medium, and a mask having a coded series of light modifying marks which represents the signal with which correlation is sought. Optical means are provided for optically imaging the light emanating from the recording medium onto the mask. This optical means includes image magnifying means, and means for varying the magnification of the image magnifying means whereby the size of the light image of the light modifying marks formed in the recording medium may be varied with respect to the size of the light modifying marks formed in the mask to thereby accomplish a Doppler scan of the signals being correlated. The system is completed by electro-optical means positioned on the side of the mask opposite the recording beam for converting light images that pass through the mask into an output electric signal representative of correlation between the mask and the track of light modifying marks being examined.

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein:

FIG. 1 is a plan view of a thermoplastic film recording medium having a record of the signal inputs from a number of signal input devices recorded thereon;

FIG. 2 is a fragmentary perspective view of a part of a thermoplastic film recording disk showing a record track of light modifying marks recorded thereon;

FIG. 2a is a greatly magnified sectional view of a portion of the thermoplastic film recording disk shown in FIG. 2 and illustrates the nature of one of the light modifying marks produced in the recording disk by electron recording;

FIG. 3 illustrates a schematic arrangement of an electron gun suitable for use in the recording equipment which comprises a part of the correlation system;

FIG. 4 is a functional block diagram of a signal correlation system constructed in accordance with the invention;

FIG. 5 is a partially broken away perspective view of a practical construction of a pulse correlation system constructed in accordance with the invention, and incorporating the elements illustrated in the functional block diagram of FIG. 4;

FIG. 7 is a functional block diagram of a light optics and electrical circuit comprising the heart of the signal correlation system constructed in accordance with the invention.

FIG. 8 is a plan view of a correlation mask employed in the signal correlation system shown in functional block diagram form in FIG. 4;

FIG. 8a is a greatly magnified view of a fragmentary section of the mask shown in FIG. 8;

FIG. 9 is a series of voltage versus time output signal characteristic curves produced by the circuit arrangement shown in FIG. 7;

FIG. 10 is a detailed schematic diagram of a light optics structure to be employed in the pulse correlation system shown in functional block diagram in FIG. 7;

Figure 12:
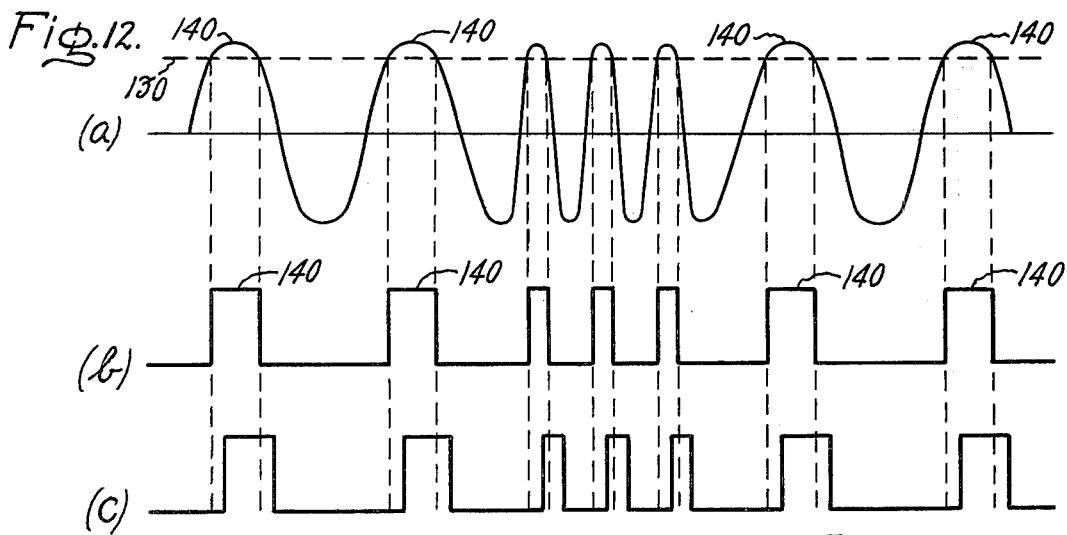

FIG. 11 is an exaggerated plan view of a part of the mask shown in FIG. 8 and illustrates the manner in which the variable magnification optics system functions to accomplish Doppler scan of a signal being correlated; and FIG. 12 is a series of voltage versus time wave shapes illustrating the nature of the transmitted and received signal being correlated, and illustrates the manner in which a Doppler shift affects the characteristics of the returning signal.

THEORY OF OPERATION

The present pulse correlation system was devised for use primarily in processing data received from a long range sonar system which is designed to keep large sectors of the ocean under surveillance. This long range sonar system is designed to detect and locate targets on or beneath the surface of the ocean within a sector extending hundreds of miles in range and of comparable breadth. Sonar detection over such long ranges requires that the returning target signal be maximized and both signal amplitude and frequency resolution be optimized. This requires that the angular and range resolution elements be quite small since small angular resolution both limits the volume seen in reception, and helps prevent destructive interference between target echoes received over different paths. With respect to range resolution, this resolution should be comparable to the echo source dimensions. Suitable high range resolution can be achieved if the target echoes returning from a long transmitted pulse having a coded modulation can be added in-phase. This coherent in-phase addition of the coded signal returns from a long transmitted pulse would enhance the target signal because random reverberation adds less effectively. The coding, such as suitable random noise, frequency modulation and the like, effectively divides the long transmitted pulse into parts corresponding to the range resolution desired. The coherent addition of the parts of the received signal can then be accomplished by comparing the changing signal returns with a suitable replica of the coded transmitted pulse. This process of correlation causes an output signal to be generated when the phase relations of a section of the received signal corresponds closely to the coded long transmitted pulse.

A problem of correlation which is turned to advantage in the present system is its sensitivity to Doppler effects which change the duration of the received signal pulses. Doppler frequency shifts, due to target motion, require that the correlation process be repeated so as to stretch or shorten the coded pulse replica to scan the velocity spectrum of any potential target. This type of correlation processing not only provides a high range resolution but also serves as a narrow band pass filter in appearance.

From the foregoing description it can be appreciated that the long range sonar system contempleated requires a new and improved signal processing system with capabilities for greater than exist in presently available systems. The search function to be carried out will involve scanning the return from thousands of angular directions, possibly hundreds of times by a pulse correlation stage to cover the Doppler spectrum in narrow increments. Accordingly, literally millions of separate operations have to be performed to process the return from each sonar transmission. The present signal correlation system was designed to achieve this end.

The purpose of a long range sonar system such as that with which the present signal correlation system is intended to be used, would be the detection and tracking of surface and subsurface craft travelling in large belts of ocean off of the coast of the United States. It is anticipated that one such system would consist of a single high powered sonar transmitter and a single receiving array of sonar hydrophone receiver elements mounted on towers. It is not essential that the subject signal correlation scheme be used in conjunction with a multiple element receiving array since many of the advantages of the novel correlation system to be described are applicable to single signal correlation problems; however, since the multiple signal processing represents the more complex application of the system, the invention has been described in connection with a multiple signal source correlation problem.

High range resolution of the system has to be achieved in order to limit reverberation to a range interval comparable to some average echo source size. This range increment ordinarily will be much shorter than the long transmitted sonar pulses envisioned in the long range sonar system and, therefore, it is anticipated that the long transmitted sonar pulses will be coded into sections. A returning echo will exhibit the same coding modulation, and detection of an echo can be accomplished by translating a record of the returned signal past a record of the coded transmitted signal. When the polarities of the returning echo signal and the replica of the coded transmitted signal are found to correspond, an output signal will be generated. The codes are chosen so that the correspondence of polarities is high only over the length of the range resolution element to be surveyed. With the present signal correlation system, bandwidths of 100 cycles and a duration of up to 60 seconds may be detected by correlation within the desired range resolution by this system.

Doppler frequency resolution will also be used to determine target velocity relative to the receiver array, and to reject reverberation outside the frequency increment under examination. This frequency resolution can be obtained by utilizing a characteristic of the correlation process just described. In utilizing this characteristic, it should be remembered that an effect of target velocity is to change the length as well as the frequency of a returning echo pulse, and that correlation by comparison of the received signal and the reference signal records requires that the lengths of the records correspond within a fraction of a cycle of modulation frequency. For long pulses, the Doppler effect can change the length of the received pulses by hundreds of cycles. Hence, for a given length of reference signal record, there is only a narrow frequency increment over which correlation can occur. In order to search for targets at expected Doppler shifts, it is necessary to repeat the correlation process with as many different code reference record lengths as there are increments in the range of Doppler frequencies to be scanned. For long transmitted pulses, this may involve hundreds of Doppler increments and, therefore, hundreds of repeated correlation operations are required. The proposed signal correlation system handles these repetitions very simply, as will be described hereinafter.

OVER-ALL SIGNAL CORRELATION SYSTEM

The signal correlation system comprising the present invention is intended for use in an over-all data processing system wherein the signal inputs from, say, 100 sonar receiving towers, are supplied separately to appropriate circuitry for amplification and hard limiting of each of the signals. The hard limiting process is designed to emphasize the polarity information in the incoming signals and to eliminate amplitude effects. This process is carried on in suitable input circuits and the electrical outputs from all 100 channels are electrically supplied to a real time recording device shown schematically at 22 in FIG. 1. The real time recording device 22 will record the signal output from each of the 100 signal towers on 100 tracks formed in a thermoplastic film recording medium in the manner shown in FIG. 1 of the drawings. By real time recording is meant that the signal inputs are recorded on the thermoplastic film recording medium in a precise one-to-one relation with respect to time that they are received from the receiving signal arrays. Hence, it the time required for a single long transmitted sonar pulse to go to the end of the range being searched and return is 22 minutes, then the real time recording of the pulse takes 22 minutes. Following the real time recording of the incoming target signals, the thermoplastic film recording medium is speeded up for the subsequent signal processing operations described hereinafter. These record tracks are then optically read out by the pulse correlation circuitry which performs the correlation operation outlined briefly above, and to be described more fully hereinafter. The signal outputs resulting from the pulse correlation process are then supplied to an output data recorder where they are recorded for display and further study.

With respect to the construction of the amplification, and hard limiting circuits, these circuits are of conventional construction and it is not deemed necessary to describe them in detail.

The real time recorder will employ a thermoplastic film recording medium, and the signals from each receiving tower will be recorded on a separate track on this recording medium. Thermoplastic film recording was first described in U.S. Pat. application Ser. No. 8842, filed Feb. 15, 1960, entitled "Method, Apparatus and Medium for Recording," W. E. Glenn, Inventor, assigned to the General Electric Company, and for a more detailed description of this recording technique reference is made to the Glenn application. Reference is also made to U.S. Pat. No. 3,063,872, entitled "Recording Medium and Polysiloxane and Resin Mixture Therefor," Edith M. Boldebuck inventor, issued Nov. 13, 1967; U.S. Pat. No. 3,008,066, entitled "Information Storage System," Sterling P. Newberry inventor, issued Nov. 7, 1961; and U.S. Pat. No. 2,985,866, entitled "Information Storage System," J. F. Norton inventor, issued May 23, 1961, all assigned to the General Electric Company. A fragmentary section of a thermoplastic recording disk is indicated at 31 in FIG. 2 of the drawings. The physical construction of this disk 31 is shown more fully in FIG. 3 of the drawings, wherein it can be seen that the thermoplastic disk itself comprises a supporting backing 32, such as Mylar or glass, which is transparent to light. Disposed over the transparent backing 32 is a transparent conductive coating 33, the purpose of which will be appreciated more fully hereinafter, and formed over the transparent conductive coating 33 is a thermoplastic film layer 34. Suitable thermoplastic layers have been described in the above-identified copending Glenn application and, hence, will not be identified further. It should be noted, however, that the characteristics of this material are such that they will retain an electron charge when electrons are written thereon in intelligence conveying patterns. These patterns when subjected to heat from an infrared or radio frequency heating device acting on the transparent conductive coating, will form a depression or light modifying mark 35 in the surface of the thermoplastic film recording medium as best shown in FIGS. 2 and 2a of the drawings. The existence of the depressions or marks 35 indicates that electrons have been written at that point in accordance with the signal being recorded. The layer itself will not form the depression 35 unless it is subjected to heat in the presence of electron patterns written thereon. Upon subjecting the thermoplastic layer to heat, the layer becomes sufficiently fluid for the electrostatic forces due to the electrons acting against the transparent conductive film to form the depression in the layer of the thermoplastic film. Hence, upon allowing the film to again solidify from its fluid or semi-liquid state, the depression will become permanent. It should be noted at this point that further heating of the thermoplastc film in the absence of electrons will erase the depression so that the light modifying marks 35, shown in FIG. 2, may be subsequently erased simply by heating the thermoplastic film and a new recording subsequently placed on the medium. The precise nature of the light modifying marks 35 is illustrated more fully in the greatly magnified view of a mark 35 shown in FIG. 2a of the drawings. This figure grossly exaggerates the size of the light modifying marks 35, but does serve to illustrate that the light modifying mark 35 constitutes a depression in the surface of the thermoplastic film layer 34 which, upon having light directed therethrough, will serve to refract the light in the manner indicated by the arrows emanating from each side of the groove 35. It is this light refracting characteristic which allows the groove to record the presence of a signal at a particular point on the surface of the thermoplastic recording medium, and then, of course, the absence of the groove will record the absence of a signal. Accordingly, if the incoming signals from each of the receiving towers in the array is allowed to turn on an electron gun at a particular point along the length of the recording medium 31, when there is a positive polarity signal present, the light modifying marks 35 will be formed in the thermoplastic film recording medium upon subsequent heating to indicate the presence of the positive polarity signal pulse at this point of time in the returning signal. At this point in the description it might be well to note that in order to read out a signal previously recorded on the thermoplastic film recording medium, a phototube indicated at 36 in FIG. 2a, is positioned to one side of a light source located under the thermoplastic film recording medium so that in the presence of a light modifying mark 35, light will be refracted from the light source onto the phototube 36. The phototube 36 will then develop an output electric signal pulse to thereby indicate the presence of a positive polarity at this point along the thermoplastic film recording medium.

A suitable electron gun design for writing multiple tracks of the light modifying marks 35 on a thermoplastic film disk is illustrated in FIG. 3. This multiple electron gun comprises an electron source 41 formed by a filament 42, a first accelerating grid 43, and an accelerating anode 44, positioned in axial alignment over the filament 42. The central openings in the accelerating grid 43 and accelerating anode 44 are sufficiently wide so that the electron source 41 emits a field of electrons that are directed through a collecting grid structure 45 towards a line of 100 control grids indicated at 46. Each of the control grids 46 is connected separately to an output from one of the sonar receiving towers through its associated amplifying, and hard limiting circuitry so that each of the individual control grids 46 will modulate the electrons passing therethrough in accordance with the signal being received from its associated receiving tower. The collector grid 45 serves to collect secondary emission electrons and to provide a uniform field for all of the control grid apertures 46. Positioned under the individual control grids 46 is a focussing electrode 47 having a series of apertures, each one of which is individually aligned with the aperture in its associated control grid 46.

During the writing operation, the transparent conductive film 33 of the thermoplastic film recording medium 31 will be grounded. In operation the electron source 41 will supply somewhere in the neighborhood of 50 microamperes of beam current in order that a maximum of about one-tenth of a microampere will be available in each of the control grid apertures 46. No deflection of the electron beams is required and this greatly simplifies the electron gun design. By this arrangement, in the absence of a signal on the control grid element 46, no electrons will be directed therethrough, and through the focussing aperture onto the thermoplastic film recording medium. However, in the presence of a signal on the control grid 46, electrons will be accelerated through the grid aperture and through the focussing aperture 47 onto the thermoplastic film recording medium. Hence, upon subsequent heating, a light refracting depression or mark 35 will be formed in a thermoplastic film recording medium at this particular point. It is, of course, to be understood that the line of control grids 46 will run transverse to the recording medium as it moves under the electron writer so that all of the tracks of light modifying marks for all of the receiving elements of the receiving array will be written simultaneously. Hence, the output side of the writing and subsequent heating stage of the recording will be some 100 tracks of light modifying marks 35 produced on the surface of the thermoplastic film recording medium 31 as illustrated in FIG. 1 of the drawings.

The functional block diagram of the over-all system employing the real time recorder and showing its relation to a thermoplastic film recording disk and a pulse correlation stage is illustrated in FIG. 4. In the system shown in FIG. 4, the several signal inputs from the respective receiving towers in the receiving array are supplied to respective amplifying channels in an amplifier shown at 51. The output from the amplifier is then supplied through a selector switch 52 to a hard limiting circuit 53 and a write amplifier 54. The output from the write amplifier is then supplied to an electron writing gun 55, which is similar in construction to the electron gun shown in FIG. 3 of the drawings. The electron gun 55 is disposed over a rotatable disk 31 having an annular thermoplastic film recording medium formed on its upper surface, and adapted to be rotated by a drive motor 56. In the particular arrangement disclosed, it is intended that the motor 56 be capable of driving the disk 31 at a first predetermined speed related to the timing required for the transmitted sonar coded pulse to reach the end of the range being surveyed, and return to the receiving array while recording is in process. During this recording phase of operation, a plurality of reference marks 81 on the periphery are read out by a photocell 82 which develops a speed control signal to accurately control the speed of rotation of the disk 31. It should also be noted that the circumference of the disk 31 at the point where the tracks 35 are being recorded is related to the speed of rotation, and to the time required to completely record the returning echo signals from one long transmitted coded pulse. Upon completion of the recording operation, the motor 56 is then speeded up for the subsequent beam forming (if required) and correlation processes. In the following discussion, it is assumed that the recorded signals being processed are of such a nature as to represent signal returns from elemental points of view within a predetermined range. Hence, such signals do not require a previous beam forming operation. The beam forming correlation process is carried out by a light source 61 positioned under the rotatable disk 31 at the point where light produced by the source will be imaged through the light modifying marks 35 onto a correlation mask 62 having light modifying marks formed therein in accordance with the transmitted coded sonar pulse and, hence, it constitutes a replica of the signal with which correlation is sought. Any light that passes through both the record tracks and the correlation mask 62 is then imaged on a second electro-optical converter comprising a photocell 63 which derives output electric signals representative of correlation between the record tracks and the correlation mask 62. These output electric signals are then supplied to a conventional thermoplastic film recording device 64 for display or further study.

A practical physical construction for the data processing system illustrated schematically in FIG. 4 is shown in FIG. 5 of the drawings. As can be readily determined from an examination of FIG. 5, the heart of the data processing system is the rotatable disk 31 of thermoplastic film on which the several tracks of signals are written for subsequent optical readout in the pulse correlation processes. For this reason, most of the components of the data processing system are built around the housing 71 for the rotatable thermoplastic disk 31 as shown in FIG. 5. The housing 71 encloses a rotatable turntable 72 which has an annular thermoplastic recording disk 31 secured around its outer periphery. The thermoplastic recording disk 31 actually comprises an annular member fabricated in the manner described with relation to FIGS. 2 and 3 of the drawings, and is sufficiently wide to accommodate at least the 100 record tracks representing the incoming signals as originally received. It is anticipated that these tracks will be recorded in concentric relation so that in effect each track is parallel with the remaining tracks in the set. The rotatable turntable 72 is suitably journalled within the housing 71 on a set of bearings, and is rotated by a multipole d.c. motor having its rotor 73 secured to the turntable, and its stator 74 secured to an axial post to which the rotatable turntable 72 is journalled. The motor 73, 74 is controlled by a speed control system, not shown in FIG. 5, which will be described more fully hereinafter. The motor 73, 74 serves to rotate the thermoplastic film recording disk 31 past the input writing gun 55 at a predetermined constant speed related to the timing of the sonar signals being transmitted and received, and the input writer 55 serves to record a plurality of tracks of light modifying marks on the thermoplastic film surface of the disk, there being one track for each of the signal receiving towers in the receiving array. Upon completion of the recording process as previously described, the motor 73, 74 is speeded up. For example, during the recording process, one revolution of the recording disk 31 may require approximately 22 minutes for a recording disk having a diameter of 5 feet. Upon completion of the recording process, however, the speed of rotation of the turntable 72 may be increased to something like 300 rpm so as to facilitate the subsequent pulse correlation operation. The recorded tracks are then rotated past the pulse correlation readout optic system indicated at 75 where the correlation process is carried out as explained more fully hereinafter for the purpose of distinguishing true target echo signals from irrelevant noise.

MOTOR DRIVE CONTROL

Figure 6:
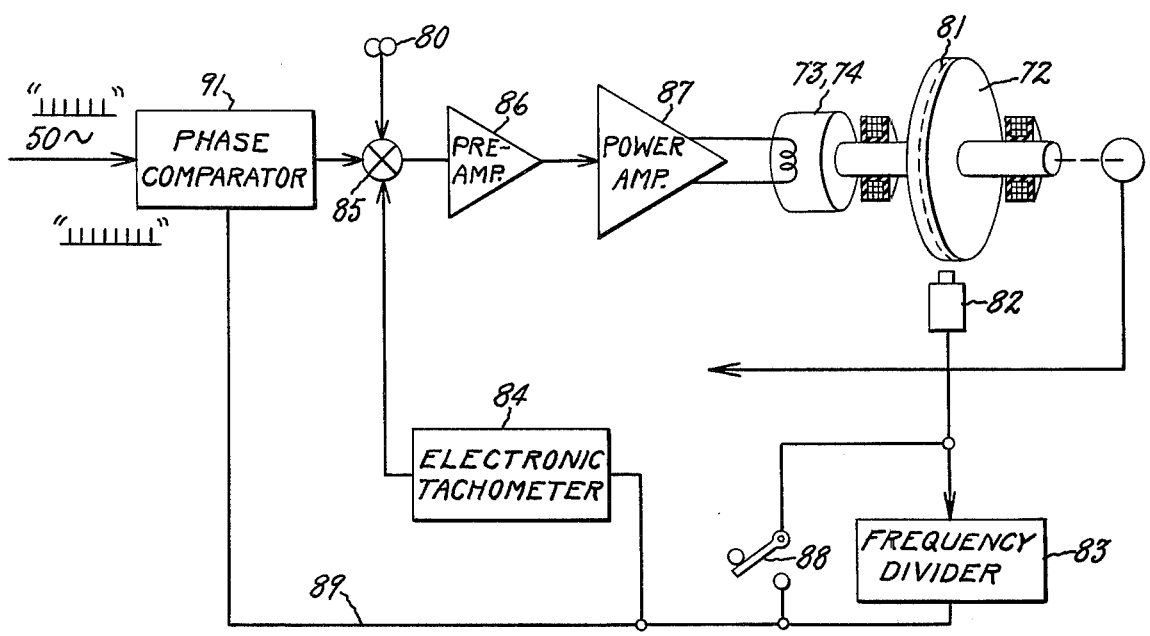
FIG. 6 is a functional block diagram of a motor speed control circuit used in driving the rotating thermoplastic film recording disk.

Optical readout for correlation requires that the incoming signal be recorded with a precise relation between recorded position on the thermoplastic film recording disk 31 and the time of reception. This requirement is reflected in the need for an accuracy of one part in 30,000 in the motor drive unit for the turntable 72 on which the thermoplastic film recording disk 31 is mounted. These accuracies apply only during the period when the drum is running at its slow recording speed of approximately 1/20th of a revolution per minute to record the incoming signals. The requirements are less severe during the period when the drum is running at a high speed, approximately 300 rpm, for processing in the pulse correlation operation. While these requirements are not too severe, they are beyond the capabilities of any open loop synchronous motor drive in view of the low rotational speed required for recording. A high performance servo system with feedback from the drum periphery is required in order to assure the kind of accuracy needed. Such systems are presently being produced by the General Electric Company, and are available commercially. One such system is the Mark 73 Director manufactured and sold by the Heavy Military Electronics Department of the General Electric Company, shown schematically in FIG. 6 of the drawings. This system is built around a gearless drive motor 73, 74 which is mechanically connected to the turntable 72 without gearing. By this arrangement gear backlash is eliminated from the servo system, thereby making possible servo gains much greater than those normally obtained with a geared system. The turntable 72 on which the thermoplastic film recording disk 31 is mounted, has a reference track 81 consisting of some 60,000 lines formed around its periphery. These reference marks are read out by an optical pick-up device 82 positioned adjacent the tracks and which converts the marks to a reference electric signal that is fed through an appropriate frequency dividing circuit 83 back to an electronic tachometer circuit 84. The signal from the electronic tachometer is then supplied to a comparator circuit 85 along with a speed control voltage 80 used to set the speed of the system. The two voltages are compared in the comparator 85 and an error signal is developed which is supplied through a preamplifier 86 and power amplifier 87 back to the motor 73 to maintain its speed constant at the value set by the speed control voltage 80. It should be noted that the frequency divider 83 is required only during the high speed operation of the motor so that during the slow speed recording operation the frequency divider 83 would be normally by-passed by a by-pass switch 88. The above system comprises a more or less conventional speed control loop which is further improved by the addition of a second feedback through the conductor 89 to a phase comparator circuit 91. Also supplied to the phase comparator circuit 91 is a 50 cycle per second signal generated by a crystal controlled oscillator (not shown) which is extremely stable in operation. The phase comparator 91 serves to compare the signal supplied over the conductor 89 to the stabilized 50 cycle signal supplied from the oscillator, and to develop an error signal if there is a difference between the two voltages which is coupled back to the reference voltage comparator 85. In this manner, operation of the drum 31 can be locked in with the 50 cycle signal source. When converting the system to high speed operation for the beam forming and pulse correlation process, all that is required is to insert the frequency divider circuit 83 into the system and to increase the speed control signal to bring the turntable speed within the high speed range of the system. Accordingly, it can be appreciated that the speed of the rotatable turntable can be controlled within the available tolerances.

SIGNAL CORRELATION

In order to eliminate interference, false echo, and other extraneous noise pulses appearing in the recorded signal, it is necessary to correlate these record tracks with the originally coded transmitted sonar signal. For this purpose, the signal correlation operation is provided. The function of the correlation proess is to compare the track records obtained from the received signal supplied from the receiving array elements with the coded transmitted sonar signal. The coding and optics are designed to produce a short signal pulse when the pulse of the returned signal picked up by the receiving array elements corresponds closely to the phase of the coded long transmitted sonar pulse. The method employed is to project an image of the moving track record upon a mask which has been designed with slits representing the code relations. In order to achieve maximum output at coincidence, it is necessary to compare the recorded beam formed signal tracks with the replica of the coded transmitted sonar pulse at all points over the entire pulse length. To accomplish this, two masks are used in an arrangement such as that shown in FIG. 7 of the drawings. Referring to FIG. 7 the thermoplastic film recording disk 31 is illustrated as having a plurality of additional tracks 125 of light modifying marks formed therein, which tracks represent the received signal resulting from the recording operation described above. Light from a light source, not shown, directs its light rays 131 through all the record tracks 125 simultaneously, and the light rays refracted from the light modifying marks 125 from the record tracks are imaged on a beam splitting device 132 which comprises a conventional light optic device for dividing a light image supplied thereto into two separate paths. One of the light images developed by the beam splitting device 132 is imaged on a first correlation mask 62a, having light modifying marks 133 formed therein in a positive replica of the positive polarities of the coded, transmitted, long sonar pulse. The remaining light image developed by the beam splitting device 132 is imaged on a second mask 62b, having light modifying marks 135 formed therein, in a negative replica of the positive polarities of the transmitted, coded, sonar pulse. Hence, the positive masks 62a will have light modifying marks or slits 133 formed therein where positive signal polarities exist in the transmitted, coded, sonar pulse, and the negative mask 62b will have no light modifying marks or slits 133 formed therein at points where positive polarities exist in the transmitted, coded, sonar signal pulse. This operation can be best visualized with respect to FIG. 12 wherein the transmitted coded signal is illustrated in FIG. 12a of the drawings. It can be appreciated that if the returning signal is received without distortion and clipped at a voltage level such as indicated by the line 130, subsequent to amplification and waveshaping, the signal would appear as shown in FIG. 12b. During the recording operation described above the signal wave-form shown in FIG. 12b turns on the electron gun and all positive polarity points such as 140 to produce light modifying marks 125 on the thermoplastic film recording disk as described with relation to FIGS. 2 and 2a. Accordingly, over the period of time during which a signal is being received, a track of such light modifying marks will be produced as shown in FIG. 2, and there will be as many tracks on the thermoplastic recording disk 31 as there are receiving elements in the array.

The beam splitting device 132 images a replica of the record tracks 125 on the disk 31 on both of the correlation masks 62a and 62b, and where light rays hit one of the light modifying tracks 133, it will be refracted by the mask to impinge upon a separate photodetector device 134 in the case of the positive mask 62a or a photodetector device 135 associated with the negative mask 62b. By this arrangement, the average output of each of the phototubes 134 and 135 will be one-half of the maximum possible output. It should be noted at this point that the photodetectors 134 and 135 are represented only schematically, since in an actual embodiment of the invention there will be a separate photodetector for each track of light modifying marks 125 in the thermoplastic recording disk 31 as will be described in connection with FIG. 10 of the drawings. The schematic arrangement of FIG. 7 is believed adequate, however to explain the mode of operation of the circuit.

In operation, the continuous noise contained in the record tracks will cause some of the light modifying marks 125 in the record track 31 to correspond to mask slits 133 in both the positive and negative masks 62a and 62b over approximately one-half the total length of the slits 133 along the tracks. The precise nature of the masks 62a and 62b is best illustrated in FIGS. 8 an 8a of the drawings, wherein it can be seen that the marks 133 extend along the length of the tracks for a period representative of the period of the transmitted coded sonar pulse. Accordingly, it can be appreciated from an examination of FIGS. 8 and 8a that in the case of the positive masks 62a, there will be a light modifying mark or slit 133 at each of the points along the length of the masks which correspond with a positive polarity point 140 on the coded, transmitted, sonar signal. The reverse of this situation is true with respect to the negative mask 62b. That is to say, at those points which ordinarily correspond to positive polarity pulse points 140 on the coded, transmitted, sonar signal, there is no mark or slit 133 in the negative mask. Because of this arrangement, the signal output from the photodetector device 134, 135 will appear as shown in FIG. 9 on curves (a) and (b), respectively. From an examination of curve (a), it can be seen that the continuous noise present along the length of the record track will cause some background potential to appear as at 136. This background potential may be due to scratches and the like on the surface of the record track 31 which causes some small amount of light to be transmitted through the light modifying marks 133 on both of the masks 62a and 62b to develop the background noise signal 136 at the output of each of the phototubes 134 and 135. However, upon the appearance of a positive polarity pulse 140 in the returned signal as recorded by a mark 125 on record track 31, a positive voltage pulse will appear as at 137 in the output of the phototube 134 due to the fact that a greater amount of light will be directed through the marks 133 in the positive mask 62a. With regard to the negative mask 62b, however, the output of the photodetector 135 will be as shown in the curve (b). In a fashion similar to that described in connection with the positive mask, a background signal level 136 will be produced in the output of the photodetector 135 due to the noise present on the record track. Upon the occurrence of a positive polarity point 140 in the transmitted, coded, sonar signal, as evidenced by a mark 125 on the record track 31, substantially all the light will be refracted to a position corresponding to a point where a slit 133 should be. However, there will be no light modifying mark or slit 133 in the negative mask 62b at this point so that the noise level will drop to the point 138 as shown in curve (b). Upon properly combining the two signal outputs from the photodetectors 134 and 135, the result will be to subtract the transient noise level or background potentials in a manner to emphasize the presence of a positive polarity pulse in the incoming received sonar signal, as shown by the increased amplitude peak at 139 in curve (c).

The manner in which the signals from the two photodetectors 134 and 135 are combined is best shown in connection with FIG. 7 of the drawings. From an inspection of FIG. 7 it can be seen that the output of the photodetector 134 is supplied to an adding circuit 141 directly, while the output of the photodetector 135 is supplied through an inverting circuit 142 of conventional construction to the adder circuit 141. The output of the adder circuit 141 may then be supplied to the data recorder to record the correlated output from the correlation operation. Since the construction of the inverter circuit 142 and the adder circuit 141 is conventional in nature, it is not believed necessary to disclose these items in detail. In operation, the inverter circuit 142 serves to invert the signal generated by the photodetector 135 some 180° when the signals are added together by adding circuit 141. The effect obtained is a subtraction of the signal developed by the photodetector 135 from the signal developed by the photodetector 134.

A feature of the pulse correlation system shown in FIG. 7 which has not yet been described is an anamorphic zoom lens assembly, shown schematically at 144 which serves as a Doppler scan for the pulse correlation system. The precise construction of this Doppler scan lens assembly is illustrated more fully in FIG. 10 of the drawing and will be described more completely hereinafter. However, its location in the pulse correlation optic system is shown in FIG. 7 for explanatory purposes. As discussed previously, coincidence can occur between two signals being correlated only if they are very nearly of the same length and their positive polarities have the same phase relation. Phase shifts, which are caused by target motion, can change the phase relations of the received sonar signal pulses being supplied from the receiving array elements. This effect is illustrated in FIG. 12c of the drawings where by comparison of FIG. 12c to FIGS. 12a and 12b, it can be seen that the phase of the received signal has been delayed. In the present system it is possible to vary the relative lengths of the apertures in the correlation masks 62a and 62b, and the received signal record by a magnification control in the pulse correlation optics. This magnification control is done mechanically along one one axis only which is in the direction of the record movement to advance or retard the phase of the track record image with respect to the correlation mask apertures. The actual effect of the magnification control is to increase or decrease with respect to a standard size the size of the image of the light modifying track 35. This magnification or demagnification, as the case may be, is in the direction of movement of the tracks so as to affect the phase relation of the image of the track mark with respect to the light modifying mark 133 on the masks 62a and 62b.

The manner in which the anamorphic zoom lens assembly operates to magnify the image along one axis only to thereby correct the phase relation of the image of the light modifying marks 125 on the track record with respect to the light modifying marks 133 on the masks 62a and 62b can best be visualized with relation to FIG. 11 of the drawings. In FIG. 11 certain of the light modifying marks on the masks are shown schematically at 133. Adjacent one of these marks or apertures, as one chooses to visualize it, are shaded areas 125' representing the light image of the light modifying mark 125 on the thermoplastic film recording disk 31. Assuming this size 125' of this image to be a standard or normal size image, then in subsequent views of the image 125'' has been increased by adjustment of the magnification control lens assembly 144 so as to increase the size of the image and thereby change the phase relation of the leading edge of the image with respect to the mark 133. This phase relation change occurs by reason of the fact that the larger sized image 125'', in effect, will reach the mark 133 at a point earlier in time along the length of the track than the normal size image 125'. At 125''' this phase relation is shown to be retarded by demagnifying the size of the image so that it, in fact, will reach the mark 133 at a point in time along the length of the track later than the normal size image 125' as the record disk 31 is rotated past the correlation masks From the preceding discussing, it can be appreciated that by increasing the magnification of the pulse correlation optics in stepped increments, a different Doppler frequency increment can be processed on each succeeding revolution of the record track 31. Complete scanning over the Doppler range can be accomplished in as many drum revolutions as there are Doppler increments in the Doppler frequency range It is, of course, necessary that all record tracks be scanned simultaneously for any given Doppler increment so as to minimize the number of operations required to scan completely any preselected Doppler frequency spectrum. The exact number of Doppler increments depends upon the length of the transmitted, coded signal and the optimum width of the Doppler frequency increment. It has been estimated that with a 100-cycle modulation band pass, and a coded, transmitted, signal having a pulse length of 60 seconds, assuming a maximum Doppler shift of plus or minus two percent due to target motion, as many as 1,000 Doppler increments may have to be processed. For shorter, coded, transmitted, signal pulses, the number of these increments could be reduced proportionately. Additionally, it is well to point out at this time that the choice of the number of tracks for the correlation process is somewhat arbitrary for any specific system under consideration. The correlation processing of multiple signal tracks is used to achieve reasonably short signal processing time.

The details of construction of the optical structures employed in the pulse correlation system is illustrated in FIG. 10 of the drawings. A light source 145 produces light rays shown at 146 that are collected by a collecting lens 147 and imaged on the thermoplastic film record disk 31. Light rays which strike the tracks of light modifying marks 125 in disk 31 are refracted at an angle that causes them to be imaged onto a projection lens 152. Light rays reaching the projections lens 152 are then imaged through a Doppler scan lens assembly comprised by a collecting lens 115, an adjustable magnifying lens 116, and a projection lens 117 that projects the light image onto the beam splitting device 132. The beam splitting device 132 then serves to split the light image into two parts and image them upon either the positive mask 62a or the negative mask 62b, not shown. The negative mask 62b has not been shown as a matter of convenience, but it is to be understood that the physical relations between the parts of the system would be somewhat different from that depicted by the arrangement illustrated in FIG. 10. After passing through the beam splitting device 132, one light beam is imaged on the positive mask 62a, for example, where that light which hits one of the light modifying marks 133 is refracted so as to be images on a light separating device 153. The light separating device 153 may comprise some 100 light pipes 154 each of which comprises a straight piece of glass rod for transmitting the light down its length and each of which has a photo diode device 155 positioned adjacent its output end. By this arrangement light which is refracted by any one of the 100 tracks of light modifying marks 125 on the record disk 31 will be imaged through the projection lens, the magnification control lens assembly, and the beam splitting device upon a corresponding track of light modifying marks 133 in the mask 62a. Light refrated by any selected track of light modifying marks 133 will then travel down its respective light pipe 154 to be imaged on the output photodiode 155 associated with that particular light pipe. In this manner, an output electric signal will be produced to indicate correlation between the particular track of light modifying marks on the record disk 31 and the transmitted, coded sonar signal insofar as that particular track is concerned. Scanning of all 100 tracks is carried out simultaneously in one revolution of the thermoplastic film recording disk 31 for any one Doppler increment.

As discussed previously, however, Doppler shifts caused by target motion can change the length of the received signal pulses. In order to correlate signals where target motion is predicted it is necessary to vary the relative lengths of the light modifying marks or apertures in the masks 62a or 62b, and the image of the signal record by means of the magnification control provided by the Doppler scan lens assembly. Hence, it is possible by incremental adjustments to the magnification provided by the anamorphic zoom lens assembly to process a different Doppler increment for each revolution of the drum. By providing as many incremental changes in the magnification of the anamorphic zoom lens assembly as there are Doppler increments to be scanned, it is then possible to carry out a complete Doppler scan of the signals being processed simultaneously with the correlation of these signals with the coded transmitted signal. It may be necessary to carry out as many as 1,000 Doppler increments, hence requiring some 1,000 rotations of the thermoplastic film recording disk 31. It is then possible for the output signals generated for each Doppler scan to be separately recorded on a conventional thermoplastic film output data recorder (not shown) so as to allow for subsequent display or study of each Doppler increment.

From the foregoing description it can be appreciated one embodiment of a new and improved signal correlation system constructed in accordance with the invention has been disclosed. Further, it can be appreciated that the new and improved correlation system employs a light optical variable magnification lens assembly to readily accomplish a Doppler scan of a received signal being correlated. Accordingly, it is believed apparent that other modifications and variations of the present invention are possible in the light of the above teachings. It is, therefore, to be understood that changes may be made in the particular embodiment of the invention disclosed which are within the full intended scope of the invention as defined by the appended claims.

What we claim as new and desire to secure by Letters Patent of the United States is:

1. A pulse correlation readout system for a track of light modifying marks formed in a recording medium comprising a light source positioned to direct light onto the recording medium, a mask having a coded series of light modifying marks formed therein representing the signal with which correlation is sought, optical means for optically imaging the light emanating from said recording medium onto said mask, said optical means including image magnifying means, and means for varying the magnification of said image magnifying means whereby the size of the light image of the light modifying marks formed in the recording medium may be varied with respect to the size of the light modifying marks formed in the mask to thereby accomplish a Doppler scan of the signals being correlated, and electro-optical means positioned on the side of said mask opposite from the recording medium for converting light images that pass through said mask into an output electric signal representative of correlation between the mask and the track of light modifying marks being examined.

2. A pulse correlation readout system comprising means for recording a track of light modifying marks on a thermoplastic film recording medium, a light source positioned to direct light onto the recording medium, a mask having a coded series of light modifying marks formed therein representing the signal with which correlation is sought, optical means for optically imaging the light passing through the thermoplastic film recording medium onto said mask, means for varying the magnification of said image magnifying means whereby the size of the light image of the light modifying marks formed in the recording medium may be varied with respect to the size of the light modifying marks formed in the mask to thereby accomplish a Doppler scan of the signals being correlated, and electro-optical means positioned on the side of said masks opposite from the recording medium for converting light images that pass through said mask into an output electric signal representative of correlation between the mask and the track of light modifying marks being examined, said optical means including image magnifying means, and means for moving said thermoplastic film recording means past said optical means for reading out the information stored on the medium at a predetermined rate.

3. A pulse correlation readout system comprising means for recording a track of light modifying marks on a thermoplastic film recording medium, a light source positioned to direct light onto the recording medium, a pair of masks having a coded series of light modifying marks formed therein representing the signal with which correlation is sought, optical means for optically imaging the light emanating from said recording medium onto said optical mask, said optical means including image magnifying means, means for varying the magnification of said image magnifying means whereby the size of the light image of the light modifying marks formed in the recording medium may be varied with respect to the size of the light modifying marks formed in the mask to thereby accomplish a Doppler scan of the signals being correlated, means including a beam splitting device for optically splitting the light image coming from the light modulating track in the thermoplastic film recording medium into two light images and imaging the split images on respective ones of said pair of masks, electro-optical means responsive to the light images that pass through said masks for developing output electric signals representative of correlation between the masks and the track of light modifying marks on the thermoplastic film recording medium, an adding circuit electrically coupled to the electro-optical means behind both masks, and an inverter circuit intercoupled between the electro-optical means behind one of said masks and the adder circuit whereby the adding circuit will develop an output electric signal representative of correlation between the masks and the tracks on the recording medium.

4. A pulse correlation readout system for a plurality of tracks of light modifying marks formed along a recording medium including in combination a light source positioned to direct light through the recording medium at least in the portion where said light modifying tracks are formed, a mask having a coded series of light modifying marks formed therein representing the signal with which correlation is sought, optical means for optically imaging the light passing through all the tracks of light modifying marks in the recording medium upon the mask, said optical means including image magnifying means, and means for varying the magnification of said image magnifying means whereby the size of the light image of the light modifying marks formed in the recording medium may be varied with respect to the size of the light modifying marks on said mask, light separating means having the light images passed through both said recording medium and said mask impinge thereon for separating the light images from each of the individual tracks, and electro-optical converting means for each of the individual tracks having said separated light beam impinge on respective ones thereof for converting the light images that pass through both said tracks on said recording medium and said mask into an electric signal representative of correlation between the mask and the tracks on said recording medium.

5. A pulse correlation readout system for a plurality of tracks of light modifying marks formed along a thermoplastic film recording medium including in combination a light source positioned to direct light through the recording medium at least in the portion where said light modifying tracks are formed, a pair of masks, one having a coded series of light modifying marks representing a positive replica of the signal with which correlation is sought and the other having a coded series of light modifying marks representing a negative replica of the signal with which correlation is sought, optical means for optically imaging the light passing through all the tracks of light modifying marks in the recording medium upon the masks, said optical means including image magnifying means, means for varying the magnification of said image magnifying means whereby the size of the light image of the light modifying marks formed in the recording medium may be varied with respect to the size of the light modifying marks on said mask, means including a beam splitting device for optically splitting the light image coming from the light modulating tracks in the thermoplastic film recording medium into two light images and imaging the split images on respective ones of said pair of masks, light separating means associated with a respective mask having the light images passed through both said recording medium and its respective mask impinge thereon for separating the light images from each of the individual tracks, electro-optical converting means for each of the individual tracks having said separated light beam impinge or respective ones thereof for converting the light images that pass through both said tracks on said recording medium and said mask into an electric signal representative of correlation between the mask and the tracks on said recording medium, and adding circuit electricially coupled to the electro-optical means behind both masks, and an inverter circuit intercoupled between the electro-optical means positioned behind the negative mask and the adding circuit whereby the adding circuit will develop an output electric signal representative of correlation between the masks and the tracks on the recording medium.

6. The combination set forth in claim 4 wherein said light separating means is comprised of a plurality of light pipes, there being one light pipe for each track of signals and means for moving the thermoplastic film recording medium past the light source, mask and readout optical means at a predetermined rate.

7. A pulse correlation readout system comprising a rotatable disk of recording medium, means for recording a plurality of parallel tracks of light modifying marks on the recording medium representing received intelligence to be correlated, a light source positioned adjacent the rotatable disk for directing light through the light modifying marks formed thereon as the disk is rotated, a mask having a plurality of parallel tracks of coded series of light modifying marks formed therein, each track representing a signal with which correlation is sought, and the number of tracks being equal to the number of tracks on the recording disk, a projection lens assembly positioned to collect light passing through any of the tracks on the recording medium and to project it on appropriate tracks on said mask, said projection lens assembly comprising a lens that is mechanically movable along one axis for varying the magnification of the image of the light modifying marks on the recording medium with respect to the size of the light modifying marks on said mask, light separating means having light that has passed through both said recording disk and said mask imaged thereon for separating the light images from each of the individual tracks, and individual electro-optical converting means for each of the tracks, each having its respective separated light beam imaged thereon by said light separating means for converting the light image into an output electric signal representative of correlation between the mask and the tracks on the recording disk.

8. A pulse correlation readout system comprising a rotatable disk of thermoplastic film recording medium, means for recording a plurality of parallel tracks of light modifying marks on the thermoplastic film recording medium representing received intelligence to be correlated, a light source positioned adjacent the rotatable disk for directing light through the light modifying marks formed thereon as the disk is rotated, a pair of masks each having a plurality of parallel tracks of coded series of light modifying marks formed therein, one mask representing a positive replica of the signal with which correlation is sought, and the remaining mask representing a negative replica of the signal with which correlation is sought with the number of tracks on each mask being equal to the number of tracks on the recording disk, a projection lens assembly positioned to collect light passing through any of the tracks on the recording medium and to project it on appropriate tracks on the masks, said projection lens assembly comprising a lens that is mechanically movable along one axis for varying the magnification of the image of the light modifying marks on the recording medium with respect to the size of the light modifying marks on the masks, means including a beam splitting device for optically splitting the light image coming from the light modulating track in the thermoplastic film recording medium into two light images and imaging the split images on respective ones of said pair of masks, light separating means associated with each respective mask having light that has passed through both said recording disk and its respective mask imaged theron for separating the light images from each of the individual tracks, and individual electro-optical converting means for each of the tracks, each having its respective seperated light beam imaged thereon by said light separating means for converting the light image into an output electric signal, an adding circuit electrically coupled to the electro-optical means behind both masks, and an inverter circuit intercoupled between the electro-optical means behind the negative mask and the adding circuit whereby the adding circuit will develop an output electric signal representative of correlation between the mask and the tracks on the recording disk.

9. The method of signal correlation comprising recording a signal to be correlated on a recording medium of the type adapted to have its light modifying characteristics altered by recording thereon, imaging a light beam onto the light modifying tracks recorded on the recording medium, disposing a mask which has a series of light modifying marks placed therein in the form of a replica of the signal with which correlation is sought over the recording medium at a readout point, optically imaging and magnifying the light emanating from the light modifying marks formed in the recording medium, varying magnification of the light image emanating from the light modifying marks in the recording medium with respect to the light modifying marks in the mask to thereby accomplish a Doppler scan of the signal being correlated, and converting the light rays passing through the apertures in the mask to an output electric signal representative of correlation between the record and the mask.

10. The method of signal correlation where the signal to be correlated has been recorded on a recording medium of the type which has its light modifying characteristics altered at points where recording takes place and which employs a mask having a series of light modifying marks placed therein in the form of a replica of the signal with which correlation is sought, said method comprising imaging a light beam onto the light modifying tracks recorded on the recording medium, disposing the mask over the recording medium at a readout point, optically imaging and magnifying the light emanating from the light modifying marks formed in the recording medium, and varying the magnification of the light image emanating from the light modifying marks in the recording medium with respect to the light modifying marks in the mask to thereby accomplish a Doppler scan of the signal being correlated.

* * * * *